March 2, 1926.                                              1,574,998
A. H. PENDLETON ET AL
ARTICULATED ELECTRIC LOCOMOTIVE TRUCK STRUCTURE
Filed Sept. 27, 1922
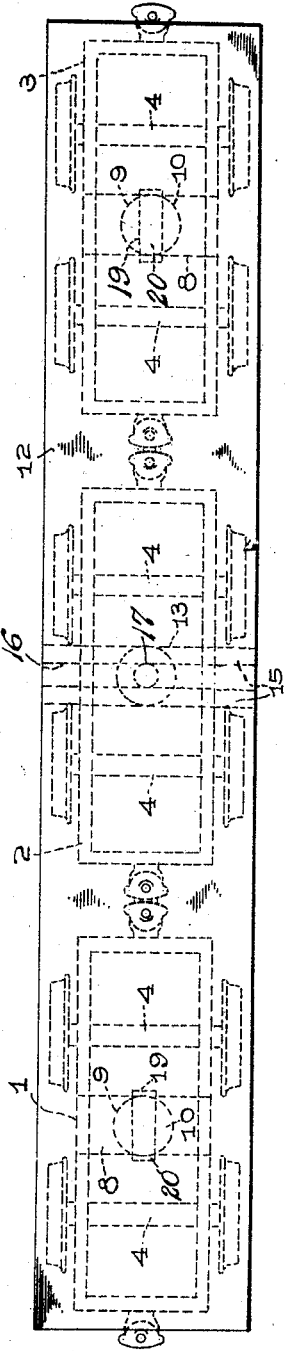
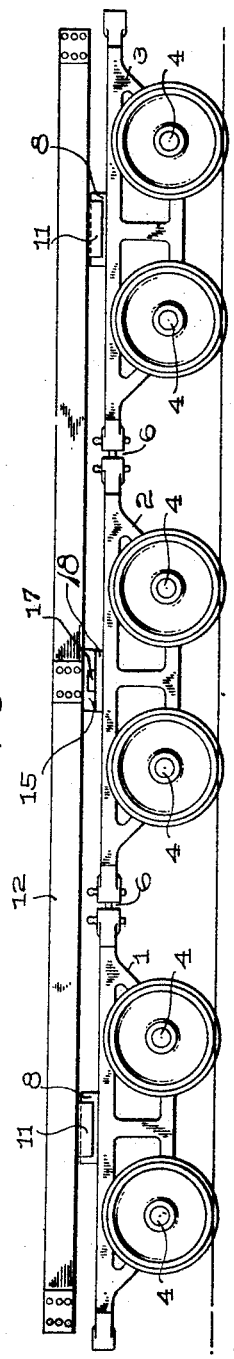
WITNESSES:
INVENTORS
Albert H. Pendleton and
Charles Jablow
BY
ATTORNEY Patented Mar. 2, 1926.

1,574,998

UNITED STATES PATENT OFFICE.

ALBERT H. PENDLETON, OF WILKINSBURG, AND CHARLES JABLOW, OF EAST PITTSBURGH, PENNSYLVANIA, ASSIGNORS TO WESTINGHOUSE ELECTRIC AND MANUFACTURING COMPANY, A CORPORATION OF PENNSYLVANIA.

ARTICULATED ELECTRIC-LOCOMOTIVE-TRUCK STRUCTURE.

Application filed September 27, 1922. Serial No. 590,782.

*To all whom it may concern:*

Be it known that we, ALBERT H. PENDLETON, a citizen of the United States, and a resident of Wilkinsburg, in the county of Allegheny and State of Pennsylvania, and CHARLES JABLOW, a citizen of the United States, and a resident of East Pittsburgh, in the county of Allegheny and State of Pennsylvania, have invented a new and useful Improvement in Articulated Electric-Locomotive-Truck Structures, of which the following is a specification.

Our invention relates to electric railway vehicles, more especially to truck construction of an improved type to permit the adaptation of articulated trucks to a single locomotive-body support.

It is among the objects of this invention to provide an articulated-truck construction which shall give a three-point support to the cab member and which shall provide lateral stability of the cab or locomotive body without excessive straining of the frame structure and the wearing members.

It is a further object of this invention to provide a connection between the main body support and the truck bolsters which shall be of simple construction, efficient in operation and mechanically durable.

In a three-truck articulated-type construction, the center of rotation of the respective truck members is about the point of their connections which effects excessive thrusts on the rear wheels of the leading and successive truck members when encountering or leaving a tangent to a curve. It is, therefore, essential to provide a yielding connection between the cab frame and the supporting bolster frames of the trucks to permit relative lateral and longitudinal movements therebetween and yielding connections between the respective trucks to provide freedom of articulation. In our present invention, we provide a center-pin construction which will permit such relative movements in the center bearings of the truck supports when rounding a curve.

In the accompanying drawing, constituting a part hereof and in which like reference characters designate like parts, Fig. 1 is a plan view of an articulated-truck system provided with center-pin supports embodying the principles of this invention, and Fig. 2 is a side elevational view thereof showing the cab frame mounted on the truck members.

Referring to Fig. 2, the structure consists of a plurality of truck frames 1, 2 and 3 provided with wheeled axles 4. The trucks 1, 2 and 3 are connected by suitable hinges 6 which provide interchangeability of the trucks and relative movement therebetween.

The frames of the front and rear trucks 1 and 3, respectively, are provided with center bearing plates 8 having annular openings 9 adapted to receive center pins 10 which are rotatably mounted therein in co-operative alinement with center bearing plates 11 secured to the supporting or under frame 12 of a locomotive.

Under frame 12 adjacent the center truck 2 is provided with a cross-tie 13 having a pair of guide ways 15 secured thereto. The guide ways provide a transverse slot or recess 16 which is adapted to receive a projecting tongue 17 of a centerpin 18 mounted on the supporting truck 2.

Referring to Fig. 1, the construction of the center pin is such as to constrain the movement of the frame 12 with respect to the truck members, which movement is effected by the lateral and longitudinal guides and cross-heads in the cab frame support and truck cross-ties. The center pin supports 8 of the front and rear trucks 1 and 3, respectively, are adapted to rotatably secure the center pins 10 which are provided with an elongated slot or opening 19 adapted to receive a correspondingly shaped tongue 20 secured to the bearing plates 11 of the cab under frame 12. The center truck 2 is of the same construction as the trucks 1 and 3 but the tongue 17 of the truck 2 is disposed transversely in the guide slot 16.

The function of the center pin construction is obvious from the illustration in that the longitudinal or transverse position of the tongues limits the movement of the cab frame with respect to the trucks and, as shown in the drawing, the center-truck-pin guide is such as to provide lateral movement with respect to the frame, whereas, the front and rear trucks permit of longitudinal movement.

This yielding connection between the cab and its supporting trucks permits the use of a rigid cab frame without effecting unusual stressing thereon as the truck members round a curve and also provides lateral stability of the locomotive body.

We claim as our invention:

1. The combination with a plurality of articulated trucks, of a vehicle body supported thereon, a connection between the body and one of the trucks to permit relative lateral movement, and a connection between the body and other trucks to permit relative longitudinal movement.

2. The combination with a plurality of articulated trucks, of a vehicle body supported thereon, a connection between the body and the center truck to permit relative lateral movement, and a connection between the body and the front and rear trucks to permit relative longitudinal movement.

3. The combination with a plurality of articulated trucks, of a vehicle body supported thereon, a connection between the body and the center truck to permit relative lateral movement, and a connection between the body and the front and rear trucks to permit relative longitudinal movement, said connection comprising a movable center pin in the center of the respective truck bolsters which are adapted to coactively engage the vehicle body.

4. The combination with a plurality of articulated trucks, of a vehicle body supported thereon, a connection between the body and the center truck to permit relative lateral movement, and a connection between the body and the front and rear trucks to permit relative longitudinal movement, said connections comprising center pins pivotally mounted in the respective truck bolsters which are cooperatively engaged in guide slots provided in the vehicle body.

5. The combination with a plurality of articulated trucks, of a vehicle body supported thereon, a connection between the body and the center truck to permit relative lateral movement, and a connection between the body and the front and rear trucks to permit relative longitudinal movement, said connections comprising center pins pivotally mounted in the respective truck bolsters, the center one of which is adapted to engage a pair of transversely disposed guide ways secured to the vehicle body and the other pins being in engagement with longitudinal guide ways of said vehicle.

In testimony whereof, we have hereunto subscribed our names this 21st day of September, 1922.

ALBERT H. PENDLETON.
CHARLES JABLOW.